Dec. 29, 1936.  H. L. BRISTOW  2,066,091
LOCKING DEVICE FOR BRAKE PEDALS
Filed June 25, 1935  2 Sheets-Sheet 1
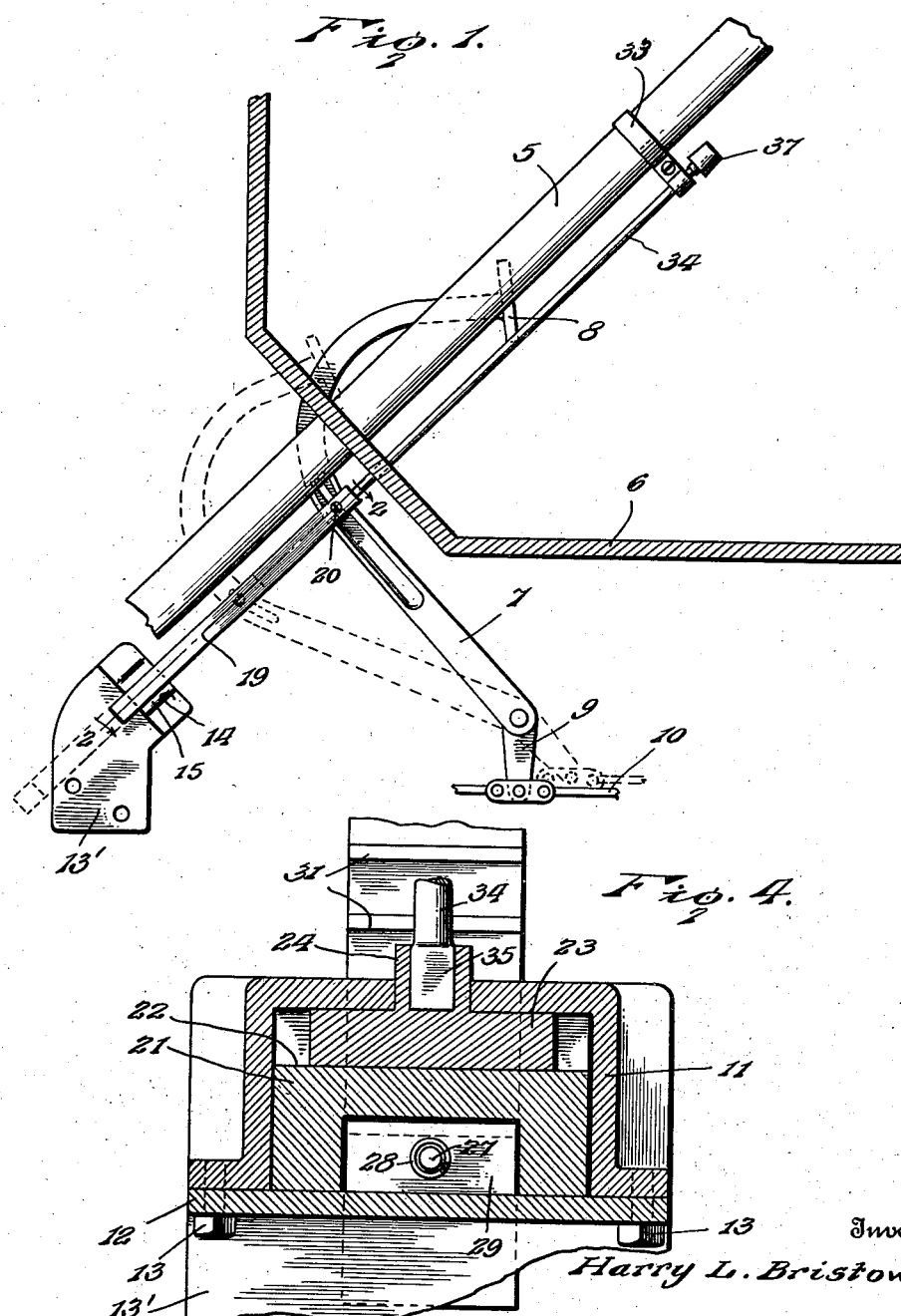
Inventor
Harry L. Bristow.
By Lacey & Lacey,
Attorneys Dec. 29, 1936. H. L. BRISTOW 2,066,091
LOCKING DEVICE FOR BRAKE PEDALS
Filed June 25, 1935 2 Sheets-Sheet 2

Inventor
Harry L. Bristow.
By Lacey & Lacey, Attorneys

Patented Dec. 29, 1936

2,066,091

UNITED STATES PATENT OFFICE 2,066,091

LOCKING DEVICE FOR BRAKE PEDALS

Harry L. Bristow, Newark, N. J., assignor of one-fifth to Charles G. Griffith and one-fifth to Homer J. Van Duyne, both of Newark, N. J.

Application June 25, 1935, Serial No. 28,367

6 Claims. (Cl. 74—541)

This invention relates to automobiles and more particularly to means for locking the brake pedals thereof.

The object of the invention is to provide a comparatively simple and thoroughly efficient device of the character described by means of which the brake pedal of an automobile or other motor driven vehicle may be locked in a set or operative position either when the vehicle is in motion or at rest and which will not interfere with the functions of the brake pedal under normal conditions.

A further object of the invention is to provide a brake pedal locking device including a rack bar pivotally connected with the brake pedal and having a locking member coacting therewith for holding the brake pedal in a set position, means being provided operable from the driver's seat for moving the locking member to operative and inoperative positions.

A still further object of the invention is generally to improve this class of devices so as to increase their utility, durability and efficiency.

In the accompanying drawings forming a part of this specification and in which similar numerals of reference indicate corresponding parts in all the figures of the drawings.

Figure 1 is a side elevation, partly in section, showing the brake pedal locking device in position on an automobile.

Figure 4 is a vertical sectional view, taken on the line 4—4 of Figure 2.

Figure 3:
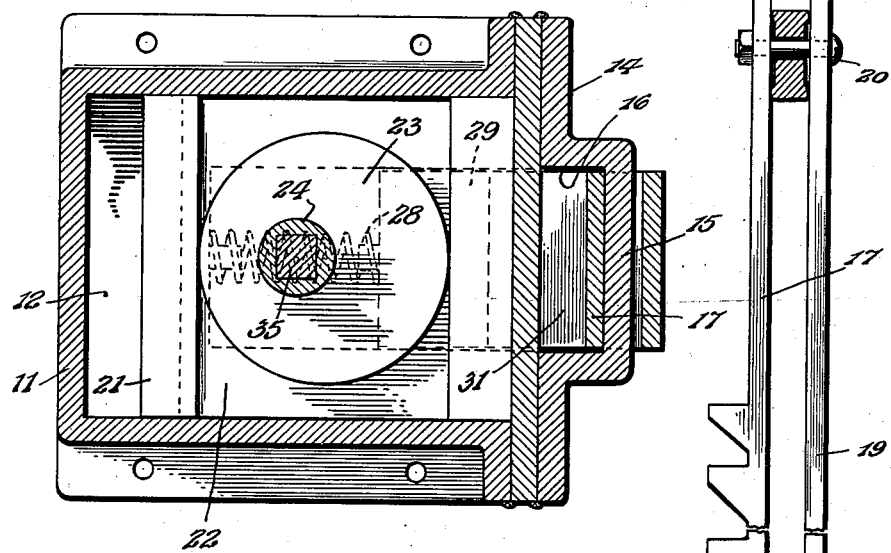
Figure 3 is a horizontal sectional view, taken on the line 3—3 of Figure 2.
Figure 2:
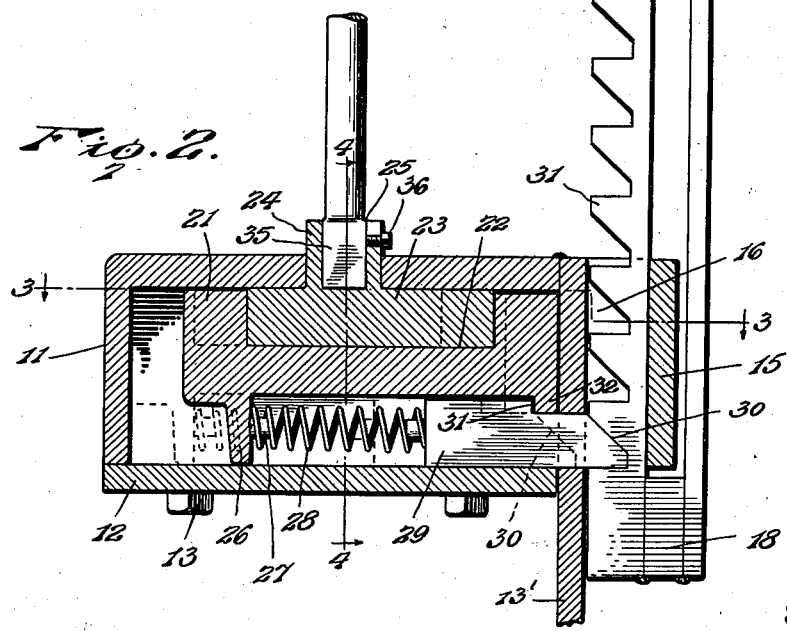
Figure 2 is an enlarged vertical sectional view, taken on the line 2—2 of Figure 1.

The improved brake pedal locking device forming the subject-matter of the present invention may be applied to automobiles, trucks, and other motor driven vehicles, and by way of illustration is shown in connection with an automobile of standard construction, in which 5 designates the steering post, 6 the foot board, and 7 the brake pedal. The brake pedal 7 extends through an opening in the footboard 6 and is provided at one end thereof with a footpiece 8 and at its other end with a link 9 connected with rods 10 leading to a brake, not shown. The device comprises a casing or housing 11 having a removable plate or cover 12 which is detachably secured thereto by bolts or similar fastening devices 13, said casing or housing being provided with a depending bracket 13' for attachment to the chassis or other part of a motor vehicle. Secured in any suitable manner to the forward end of the casing 11, as by spot welding or otherwise, is an auxiliary plate 14 having its intermediate portion offset at 15 to form a guide 16 for a sliding rack bar 17. Spaced from the rack bar 17 by a filler block 18 and disposed parallel with said rack bar is an auxiliary bar 19 and this auxiliary bar 19 extends on the outside of the offset portion 15 of the plate 14, as best shown in Figure 3 of the drawings. The upper ends of the bars 17 and 19 straddle the brake pedal 7 and are pivotally connected therewith, as indicated at 20, so that movement imparted to the brake pedal will impart a corresponding movement to the rack bar. Disposed within the casing or housing 11 is a sliding block 21 having its upper face cut away to form a seating recess 22 in which is mounted a cam or eccentric 23 having a stem 24 which projects through an opening in the upper face of the casing and is provided with a socket 25. The sliding block 21 is formed with a depending lug 26 having a centering boss 27 projecting laterally therefrom and over which extends one end of a coiled spring 28, the opposite end of which fits over a similar centering boss on a sliding catch or locking member 29. The free end of the locking member or catch 29 is beveled at 30 so as to permit it to ride freely over the inclined faces of the teeth 31 of the rack bar 17 when said rack bar is pressed downwardly but prevents return movement of the rack bar after it has reached a predetermined or set position. The locking member or catch 29 is provided with a shoulder 31 which coacts with a corresponding shoulder 32 formed on the sliding block 21 so that when the block 21 is retracted by the action of the cam 23, the beveled end of the locking member or catch will be moved out of the path of the teeth on the rack bar. Disposed parallel with the steering post and connected therewith by a clip or other suitable device 33 is an actuating rod 34, the lower end of which is provided with a squared head 35 which fits within the socket 25 and is secured therein by a set screw 36. The outer or upper end of the rod 34 is provided with a finger piece 37, by turning which the cam 23 may be rotated to move the block 21 longitudinally within the casing 11 and thereby retract the locking member or catch 29 when it is not desired to use the device.

Under normal conditions the locking member or catch 29 is housed within the casing 11 so that the brake pedal 7 can perform its functions in the usual manner. When, however, it is desired to lock the brake pedal in a set position, the finger piece 37 is rotated which causes the cam 23 to move the block 21 forwardly within the casing 11 carrying the locking member with it so that the beveled end of the locking member will be disposed in the path of the teeth on the rack bar 17. By then pressing downwardly on the brake pedal 7 in the usual manner, the teeth on the rack bar will ride over the beveled end of the catch until the brake is set when the catch by engagement with the teeth on the rack bar will lock said rack bar against further movement and, consequently, lock the pedal 7 in braking position. In order to release the locking member and thereby permit the brake pedal to function in the usual manner, it is merely necessary to rotate the finger piece 37 in the opposite direction, which movement actuates the cam 23 to retract the block 21 carrying with it the locking member so that the brake pedal may operate without interference.

It will thus be seen that there has been provided a comparatively simple and inexpensive device capable of being readily attached to any style or make of motor vehicle and by means of which the brake pedal is locked in a set position either when the car is in motion or at rest and which is so constructed as to permit the brake pedal to function in the ordinary or usual manner without interference when desired. It will, of course, be understood that the devices may be made in different sizes and shapes to adapt them for use on any particular style or type of motor vehicle without departing from the spirit of the invention.

If desired, a suitable lock may be inserted in or attached to the finger piece or knob 37 to prevent an unauthorized person from operating the brake pedal.

Having thus described the invention, what is claimed as new is:

1. In an automobile, a brake pedal, a rack bar pivotally connected with the brake pedal, a casing, a block slidably mounted in the casing and provided with a seating recess, a catch movable with the block and adapted to engage the rack bar for holding the brake pedal in a set position, a cam engaging the seat in the sliding block, and an operating rod connected with the cam and operable from the driver's seat for moving the catch out of engagement with the teeth on the rack bar.

2. In an automobile, a brake pedal, a casing having an offset portion forming a guide, a rack bar pivotally connected with the brake pedal and operating in said guide, a block slidably mounted in the casing and provided with a seating recess, a spring actuated catch carried by the block, a cam disposed within the seating recess of the block, and an operating rod connected with the cam and extending to the driver's seat for retracting the block to disengage the catch from the teeth on the rack bar.

3. In an automobile, a brake pedal, a casing, a plate secured to one end of the casing and provided with an intermediate offset portion forming a guide, a rack bar operating in the guide and pivotally connected with the brake pedal, a block slidably mounted within the casing and having one end thereof provided with a depending lug and its other end with a stop shoulder, the upper surface of the block being provided with a seating recess, a catch slidably mounted in the casing and provided with a stop shoulder coacting with the shoulder on the block, a spring interposed between the lug on the block and said catch, a cam fitting in the seating recess, and an operating rod extending from the cam to a point adjacent the driver's seat for moving the catch out of the path of the teeth on the rack bar.

4. In an automobile, a brake pedal, a casing having means for attachment to a fixed portion of the automobile and provided with a removable cover plate, a rack bar pivotally connected with the brake pedal, a block slidably mounted in the casing and provided with a seating recess, a spring actuated catch movable with the block, a cam fitting in the seating recess and provided with a socket, and an operating rod fitting in the socket and extending to the driver's seat for rotating the cam to retract the catch out of the path of the teeth on the rack bar.

5. In an automobile, a brake pedal, a casing, a plate secured to the casing and having its intermediate portion offset to form a guiding recess, a rack bar slidably mounted in said recess on one side of the offset portion of the plate, a bar spaced from the rack bar and operating on the other side of the offset portion of the plate, said bars being pivotally connected with the brake pedal, a block slidably mounted in the casing and provided with a seating recess, a spring actuated catch carried by and movable with the block, the end of said catch being beveled and adapted to engage the teeth on the rack bar, a cam fitted in the seat of the block, and an operating rod connected with the cam and having a finger piece operable from the driver's seat for rotating the cam and retracting the catch.

6. In an automobile, a brake pedal, a rack bar pivotally connected with the brake pedal, a casing, a spring actuated locking member slidably mounted in the casing and engaging the rack bar for holding the brake pedal in a set position, a cam operatively connected with the locking member, and a rod connected with the cam and operable from the driver's seat for rotating the cam to release the locking member.

HARRY L. BRISTOW.